Patented May 4, 1954

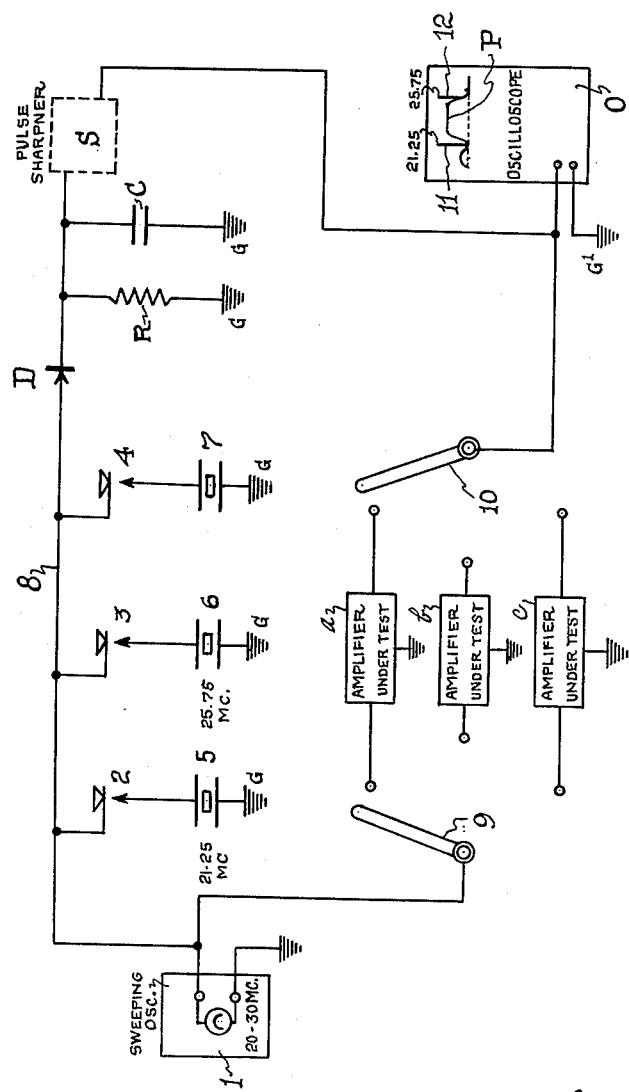

2,677,804

UNITED STATES PATENT OFFICE 2,677,804

MEANS FOR TESTING HIGH-FREQUENCY APPARATUS

Harry R. Foster, Lake Valhalla, and Elmo E. Crump, West Caldwell, N. J., assignors to Ohmega Laboratories, Pine Brook, N. J., a partnership composed of Harry R. Foster and Elmo E. Crump Application October 5, 1951, Serial No. 249,988

9 Claims. (Cl. 324—57)

This invention relates to an electrical system for generating marker-pulses for use in determining or identifying the frequency of several desired points on a visual display such as are used in television sets. During the last few years the sweeping oscillator and oscilloscope have become very necessary and valuable instruments for obtaining and visualizing the pass-band of amplifiers and filters used especially in television and radar work. A need has also arisen for a fast and accurate method of identifying the frequency of several desired points on the visual display of the oscilloscope. To determine these frequencies it has been proposed to employ a variable frequency generator to deliver impulses known in the trade as "birdies" and to apply these frequencies to the amplifiers or to the other parts of the circuit to determine if these parts are properly tuned. We have found from much study and tests that superior markers or "pips" can be obtained by using quartz crystals in a suitable circuit arrangement to which reference will be directly made. When our arrangement is used employing standard commercial crystals we have "pips" accurate to 0.01%. Our invention is exemplified in the circuit accompanying this specification. In this circuit 1 is a crystal control sweeping oscillator adapted to cover a high frequency range from 20 to 30 megacycles within 1/60 of a second. For the purpose of illustration but not of limitation, the frequencies at which we have chosen to deliver a pair of pips are 21.25 megacycles and 25.75 megacycles. Connected to the output side of the oscillator generator through switches 2, 3, and 4, etc. are quartz crystals, 5, 6, and 7, one side of each of the crystals being connected to ground. Also connected directly to the lead 8 coming from the generator is a detector D. The output side of the detector D is connected in parallel relationship to a ground G, a reactance R and condenser C. The output side of the detector D is also connected to an oscilloscope O although a pulse sharpener S may be connected into this lead to the oscilloscope. The oscillator generator 1 is also connected to a switch 9 that may have a plurality of contacts extending to amplifiers utilized in the instrument and being tested for correct frequency. The output of the amplifiers is connected by the switch 10 to the input side of the oscilloscope O, which indicates an output P coming from the sweeping oscillator through the amplifier under test. This output being derived from the output side of the amplifiers under test. It is to be understood that crystals 5 and 6 are set to respond to the frequencies marked and when this frequency is applied to these crystals with the oscillator 1, a sharp voltage change takes place on the detector D thereby giving a transient response or "pip" which is converted into a low frequency by means of the detector D and the network R and C which network has two functions, i. e. to provide a load across the detector output of the crystals and also to filter out and by-pass any high-frequency which may leak through the detector. By this arrangement the pips 11 and 12 are obtained at a low frequency of the disturbances established by the crystals. It will be noted that the pip 11 is made in the lower portion of and beginning of the curve P, while the pip 12 is located at one-half the distance between the maximum and minimum points at the end of the curve P. If these "pips" occur at any other place on the wave form or curve P, it indicates that the amplifier which is under test is not properly aligned. This response with the "pips" or frequency markers can be and usually are repeated over and over again on the face of the oscilloscope. In looking at this picture, it looks as though a solid line were drawn on the oscilloscope, but in reality it is the eye which integrates these many thousands of traces which are drawn in light similar to that of the picture on a television receiver.

As heretofore stated a pulse sharpener to emphasize the pips 11 and 12 may or may not be used depending on the circumstances. While we have shown only three crystal controls, the number may be varied to suit the instruments or parts thereof to be tested.

Having thus described our invention, what we claim is:

1. A high frequency marker system as described comprising a single sweeping oscillator, a plurality of quartz crystals set to pass predetermined frequencies and directly connected in parallel relation to the output of said oscillator, a detector connected directly in series with the output of the oscillator beyond said crystals, filter means connected to the output side of the detector, an oscilloscope connected to the output side of the detector and devices such as amplifiers or instruments adapted to be connected between the oscillator and the oscilloscope in direct parallel relation to said crystals and filter.

2. A high frequency marker system as set forth in claim 1 further defined in that a pulse sharpener may be connected in that part of the system leading from the filter to the oscilloscope.

3. A high frequency marker system as described comprising a single sweeping oscillator, adapted to deliver a range of frequencies from 20 to 30 megacycles within one sixtieth of a second, a pair of crystals directly connected in parallel relation to the output of the oscillator, a detector directly in the output circuit of the oscillator beyond the crystals which are set to pass frequencies of 21.25 and 25.27 megacycles, filter means connected to the output side of the detector and to the input side of an oscilloscope and devices whose frequency is to be tested connected between the oscillator and oscilloscope in parallel with the crystals and filter.

4. Means for testing apparatus used in high frequency circuits including a single sweeping oscillator and crystals of a suitable kind capable of quickly changing their impedance from a low to a high value and directly connected in parallel with the oscillator output circuit whereby an accurately position signal or "pip" is obtained, a detector and filter directly connected for converting the envelope of the high frequency signal into a low frequency one, an oscilloscope for receiving said low frequency signal or pip as well as the response from a device connected between the oscillator and oscilloscope in direct parallel relationship with said crystals and filter.

5. Means for testing apparatus as set forth in claim 4 further defined in that the oscillator generator delivers a range of frequencies from approximately 20–30 megacycles within a very short space of time while at least two of the crystals are set to pass current at chosen spaced megacycles within this range whereby definite impulses are set up, a detector for directly receiving said impulses and converting them to low frequency in association with a filter, an oscilloscope for receiving said impulses, an amplifier or other device whose frequency is to be tested connected between the oscillator output and the oscilloscope input in parallel with said crystals and filter whereby said impulses are applied to the curve from the amplifier or other device so an observer can see the position of the impulses on said curve as and for the purposes set forth.

6. Means for testing parts of television apparatus, such as amplifiers therein, including a single oscillator generator capable of delivering power at high frequency including the order of 20 to 30 megacycles, a pair of quartz crystals directly connected across the output circuit of the oscillator generator, one crystal being set for a frequency of 21.25 megacycles while the other is set for a frequency of 25.75 megacycles, said crystals being capable of producing quick and sharp impulses or pips, a detector for receiving said impulses to change the frequency from a high to a low value, a filter to receive the detector output, an oscilloscope connected to the filter, a device such as an amplifier having a pre-determined frequency band width and voltage amplification curve, the device or amplifier being connected between the output of the oscillator generator and the input of the oscilloscope in parallel with said crystals and filter whereby said impulses or pips are impressed on said curve as and for the purpose described.

7. Means for testing parts of television apparatus, such as amplifiers therein, as set forth in claim 6 further defined in that a pulse sharpener may be inserted in the circuit between the filter and oscilloscope.

8. Means for testing parts of television apparatus, such as amplifiers therein, as set forth in claim 6 further defined in that more than two crystals may be used with each adapted to be switched into operative position as desired while the device whose frequency is to be tested may likewise be switched into operative position.

9. Means for testing the frequency utilized in a radio apparatus comprising, a single oscillator to deliver a high frequency voltage which is applied to at least some part of the apparatus, an oscilloscope to receive a wave from said part, at least two crystals to directly receive the same voltage from the oscillator, the crystals being set to instantly respond to different chosen frequencies from the oscillator and each crystal being capable of producing sudden and sharp pip changes in the voltage, a detector and filter for directly passing these pips on to the oscilloscope at a lower frequency, whereby the pips will be impressed on the wave from the part being tested, in such a manner that an observer can determine if the said part is in a proper tuned condition.

References Cited in the file of this patent
UNITED STATES PATENTS

| Number | Name | Date |
|---|---|---|
| 2,422,134 | Sanders, Jr. | June 10, 1947 |
| 2,483,802 | Bradley | Oct. 4, 1949 |
| 2,493,145 | Jaffe | Jan. 3, 1950 |
| 2,534,957 | Delvaux | Dec. 19, 1950 |
| 2,610,228 | Devine | Sept. 9, 1952 |
| 2,626,980 | Balde et al. | Jan. 27, 1953 |